(12) United States Patent
Cherng

(10) Patent No.: US 8,003,240 B2
(45) Date of Patent: Aug. 23, 2011

(54) POWER DISCONNECTION APPARATUS FOR SOFT-SHELL LI ION BATTERY

(75) Inventor: Jing-Yih Cherng, Tao-Yuan (TW)

(73) Assignee: Amita Technologies Inc Ltd., Tao-Yuan (TW)

( * ) Notice: Subject to any disclaimer, the term of this patent is extended or adjusted under 35 U.S.C. 154(b) by 0 days.

(21) Appl. No.: 12/813,648

(22) Filed: Jun. 11, 2010

(65) Prior Publication Data

US 2010/0248018 A1 Sep. 30, 2010

Related U.S. Application Data

(62) Division of application No. 12/046,669, filed on Mar. 12, 2008, now Pat. No. 7,785,731.

(51) Int. Cl.
*H01M 2/00* (2006.01)
*H01M 2/02* (2006.01)
(52) U.S. Cl. .......................................... 429/61; 429/178
(58) Field of Classification Search .................... 429/61, 429/122–347
See application file for complete search history.

(56) References Cited

U.S. PATENT DOCUMENTS

| | | | | |
|---|---|---|---|---|
| 6,080,508 | A * | 6/2000 | Dasgupta et al. | 429/127 |
| 6,344,292 | B1 * | 2/2002 | Nemoto et al. | 429/56 |
| 6,391,494 | B2 * | 5/2002 | Reitz et al. | 429/219 |
| 2004/0126650 | A1 * | 7/2004 | Kim | 429/61 |

* cited by examiner

*Primary Examiner* — Basia Ridley
*Assistant Examiner* — Jonathan G Leong
(74) *Attorney, Agent, or Firm* — Chun-Ming Shih; HDLS IPR Services

(57) ABSTRACT

A power disconnection apparatus includes a soft-shell Li ion battery and a power disconnection device. The soft-shell Li ion battery includes anode pin and a cathode pin and a soft shell enclosing the soft-shell Li ion battery. The power disconnection device includes a panel attaching to the surface of the shell of the soft-shell Li ion battery and a separation unit arranged at topside of the panel and corresponding to one of the anode pin and the cathode pin. The shell has expansion when the soft-shell Li ion battery is over-charged and the panel is move away from the soft-shell Li ion battery. Therefore, the separation unit disconnects power to the anode pin or the cathode pin.

2 Claims, 8 Drawing Sheets

POWER DISCONNECTION APPARATUS FOR SOFT-SHELL LI ION BATTERY

This application is a divisional application of U.S. patent application Ser. No. 12/046,669, filed on Mar. 12, 2008 now U.S. Pat. No. 7,785,731.

BACKGROUND OF THE INVENTION

1. Field of the Invention

The present invention relates to a power disconnection apparatus, especially to a power disconnection apparatus for soft-shell Li ion battery.

2. Description of Prior Art

High-capacity battery becomes increasingly important as the prevailing of mobile electronic device. More particularly, lithium ion (Li-ion) battery using lithium transition metal as anode and carbon material as cathode is under extensive research.

However, the Li-ion battery is subjected to an over-charge problem when excessive Li ion is extracted from anode and lithium metal is precipitated due to insertion of Li ion at cathode. Unstable peroxide is generated at anode, which loses lithium ion. The organic solvent in the electrolyte has decomposition reaction when the over-charge voltage is above a voltage threshold. Moreover, lots of flammable gas is also generated. The battery has abnormal heating due to rush heat generation, which induces risk of battery damage.

The applicant of the subject application has proposed various protective mechanisms for charging battery, for example, Taiwan Utility Model TWM292169 and TWM275625. More particularly, Taiwan Utility Model TWM292169 discloses a protection apparatus for Li-ion battery. The protection apparatus for Li-ion battery comprises an abnormality detection circuit and a photo-coupling circuit. The abnormality detection circuit examines the voltage of the rechargeable battery and outputs a detection signal. The photo-coupling circuit is electrically connected to the abnormality detection circuit and adjusts an impedance thereof according to the detection signal output from the abnormality detection circuit. The connection between the rechargeable battery and an external circuit is opened or close for discharging or charging the rechargeable battery. The Taiwan Utility Model TWM275625 also discloses a protection apparatus for rechargeable battery. The protection apparatus for rechargeable battery mainly comprises a first protection loop and a second protection loop. The first protection loop comprises a main current load connected to a main circuit and a battery, and a thermo-coupler switch connected to the battery and the main circuit. The second protection loop comprises a protection circuit and a heater. The protection circuit is connected to the main circuit and senses the battery voltage for generating a start signal. The heater is connected to the protection circuit and is activated by the thermo coupler switch. Moreover, the mechanical protection apparatus for cylindrical hard-shell Li ion battery activates a blow-off valve when the internal pressure is increased due to excessive charging of batter. A conductive pin is broken by the operation of the blow-off valve to provide protection.

The above-mentioned protection mechanism for Li ion battery can provide limited protection for over-charged Li ion battery. However, the above-mentioned protection mechanism has risk of damaging components of battery after long time use. The mechanical protection mechanism for the cylindrical hard-shell Li ion battery cannot be used for soft-shell Li ion battery. Moreover, the above-mentioned protection mechanism has complicated components. It is desirable to provide a protection mechanism for Li ion battery with simple structure and with no harm to the components of the Li ion battery.

SUMMARY OF THE INVENTION

It is the object of the present invention to provide a power disconnection apparatus for a soft-shell Li ion battery, wherein a separation unit is arranged with respect to the pins of the soft-shell Li ion battery. The volume expansion of soft-shell Li ion battery after heating is exploited to disconnect power delivered to the pin by the separation unit. The structure for the protection mechanism is simplified with lower cot and the explosion of soft-shell Li ion battery can also be prevented.

Accordingly, the present invention provides a power disconnection apparatus for a soft-shell Li ion battery. The power disconnection apparatus comprises a soft-shell Li ion battery and a power disconnection device. The soft-shell Li ion battery includes anode pin and a cathode pin and a soft shell enclosing the soft-shell Li ion battery. The power disconnection device includes a panel attaching to the surface of the shell of the soft-shell Li ion battery and a separation unit arranged at topside of the panel and corresponding to one of the anode pin and the cathode pin. The shell has expansion when the soft-shell Li ion battery is over-charged and the panel is move away from the soft-shell Li ion battery. Therefore, the separation unit disconnects power to the anode pin or the cathode pin.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
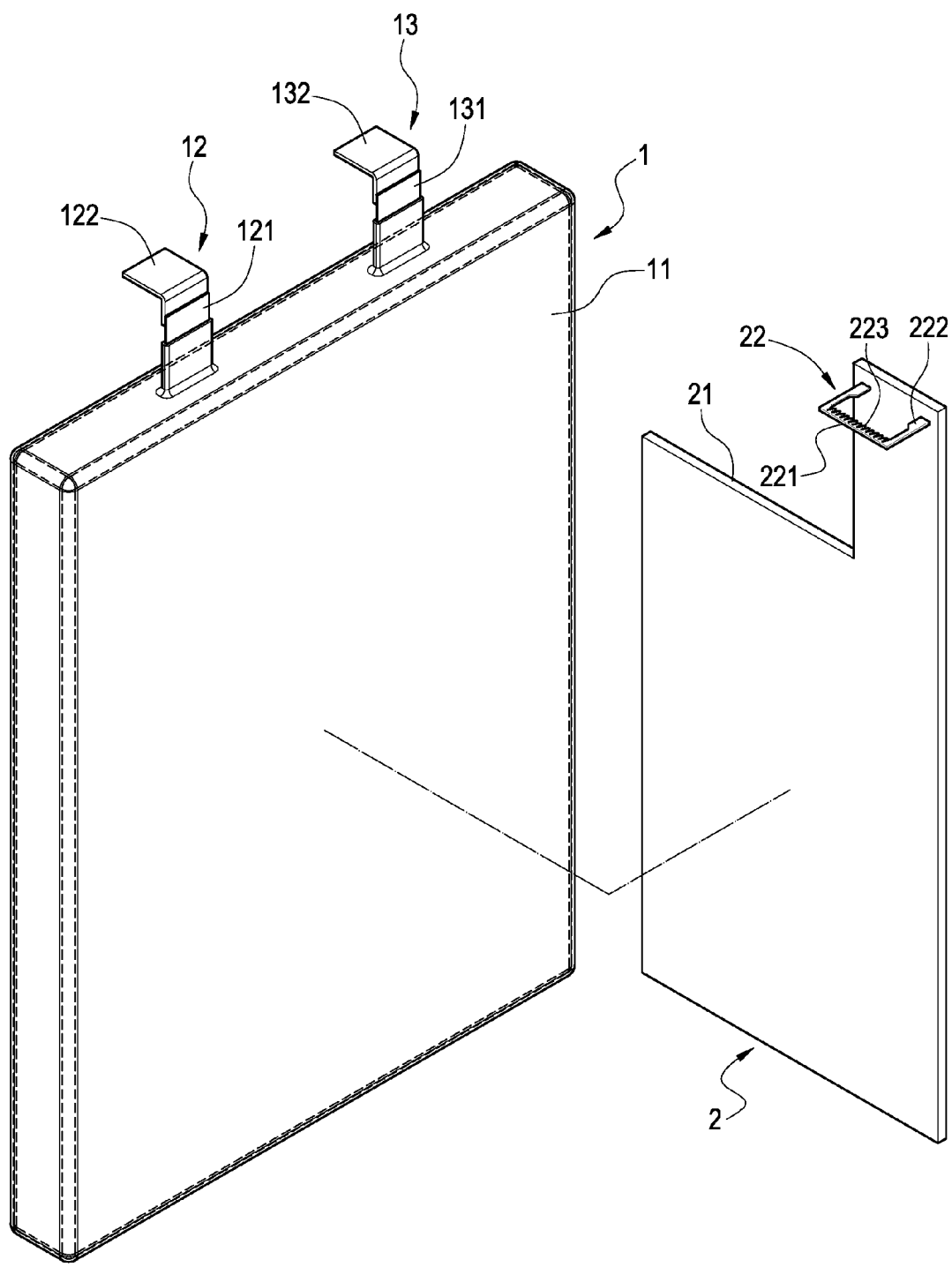
FIG. 1 is an exploded view of the present invention.
Figure 2:
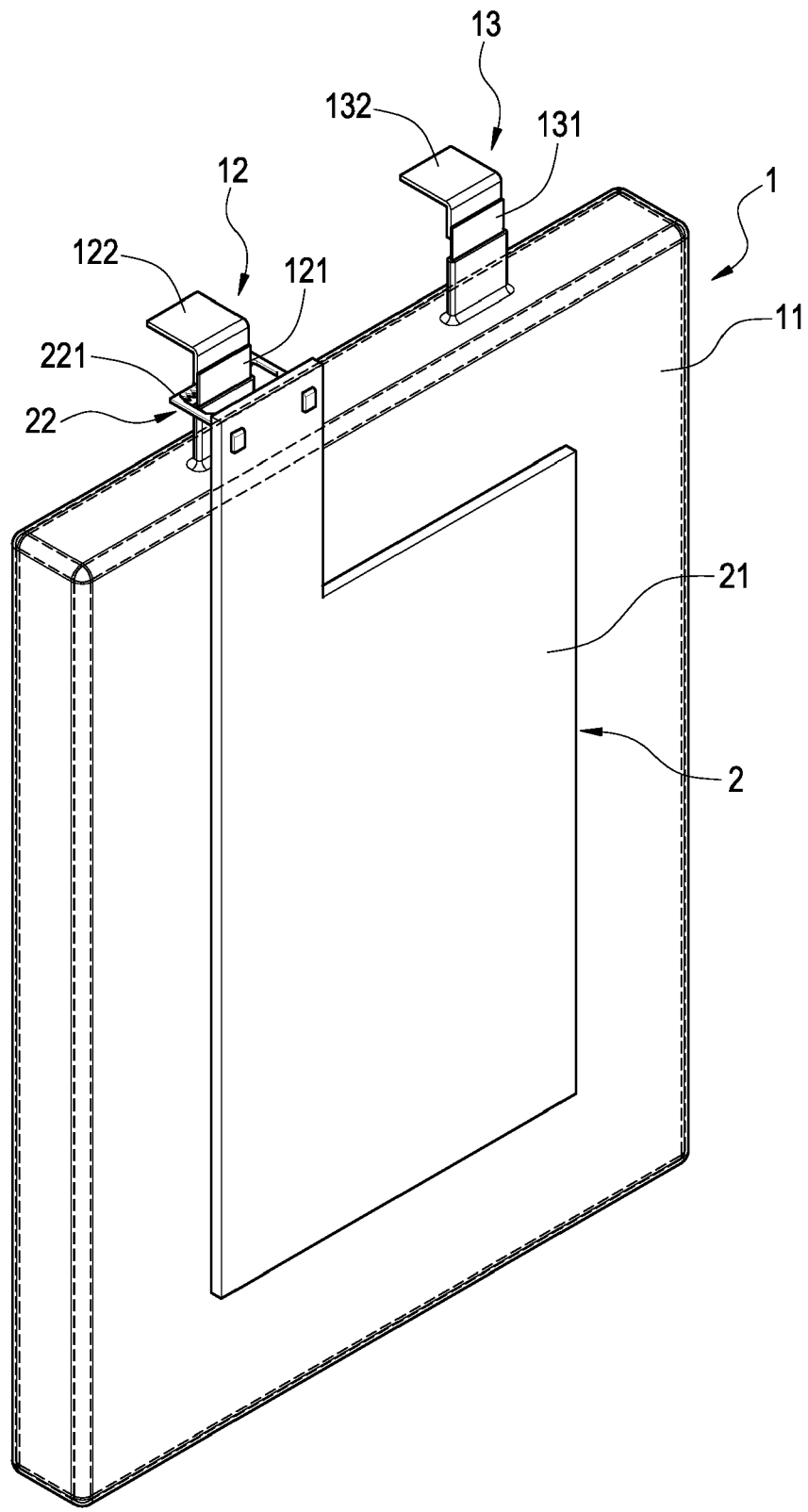
FIG. 2 is a perspective view of the present invention.
Figure 3:
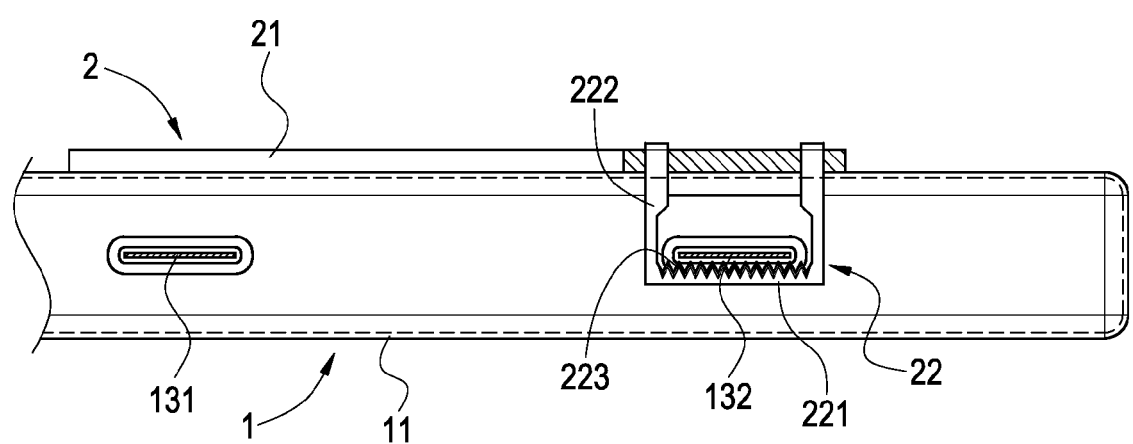
FIG. 3 is a top view of the present invention.

With reference to FIGS. 1 to 3, the power disconnection apparatus according to the present invention comprises a soft-shell Li ion battery and a power disconnection device.

The soft-shell Li ion battery 1 comprises a plurality of anode plates and cathode plates and isolation film (not shown) sandwiched between the anode plates and cathode plates. A soft shell 11 encloses the anode plates, the cathode plates and the isolation film, which is, for example, an aluminum foil or foil of other metal. An anode pin 12 and a cathode pin 13 are connected to the topside of the soft-shell Li ion battery 1, respectively. The anode pin 12 comprises an anode leg 121 connected to each of the anode plates and an anode flange 122 connected to one end of the anode leg 121. The anode leg 121 can be made of aluminum foil. The cathode pin 13 comprises a cathode leg 131 connected to each of the cathode plates and a cathode flange 132 connected to one end of the cathode leg 131. The cathode leg 131 can be made of copper foil.

The power disconnection device 2 comprises a panel 21 attached to the shell 11 of the soft-shell Li ion battery 1 and a separation unit 22 connected to the topside of the panel 21 and corresponding to the anode pin 12. The panel 21 is a rigid plate made of plastic material or other material. The separation unit 22 comprises a cutting knife 221 and two fixing arms 222 extended vertically from both sides of the cutting knife 221. The cutting knife 221 and the panel 21 are formed on opposite sides with respect to the anode pin 12; and the fixing arms 222 are connected to the panel 21. The cutting knife 221 comprises continuous teeth 223 on the side facing the anode pin 12 and used to cut the anode leg 121 of the anode pin 12. Moreover, the separation unit 22 can also be arranged with respect to the cathode leg 131 to achieve the similar effect.

Figure 4:
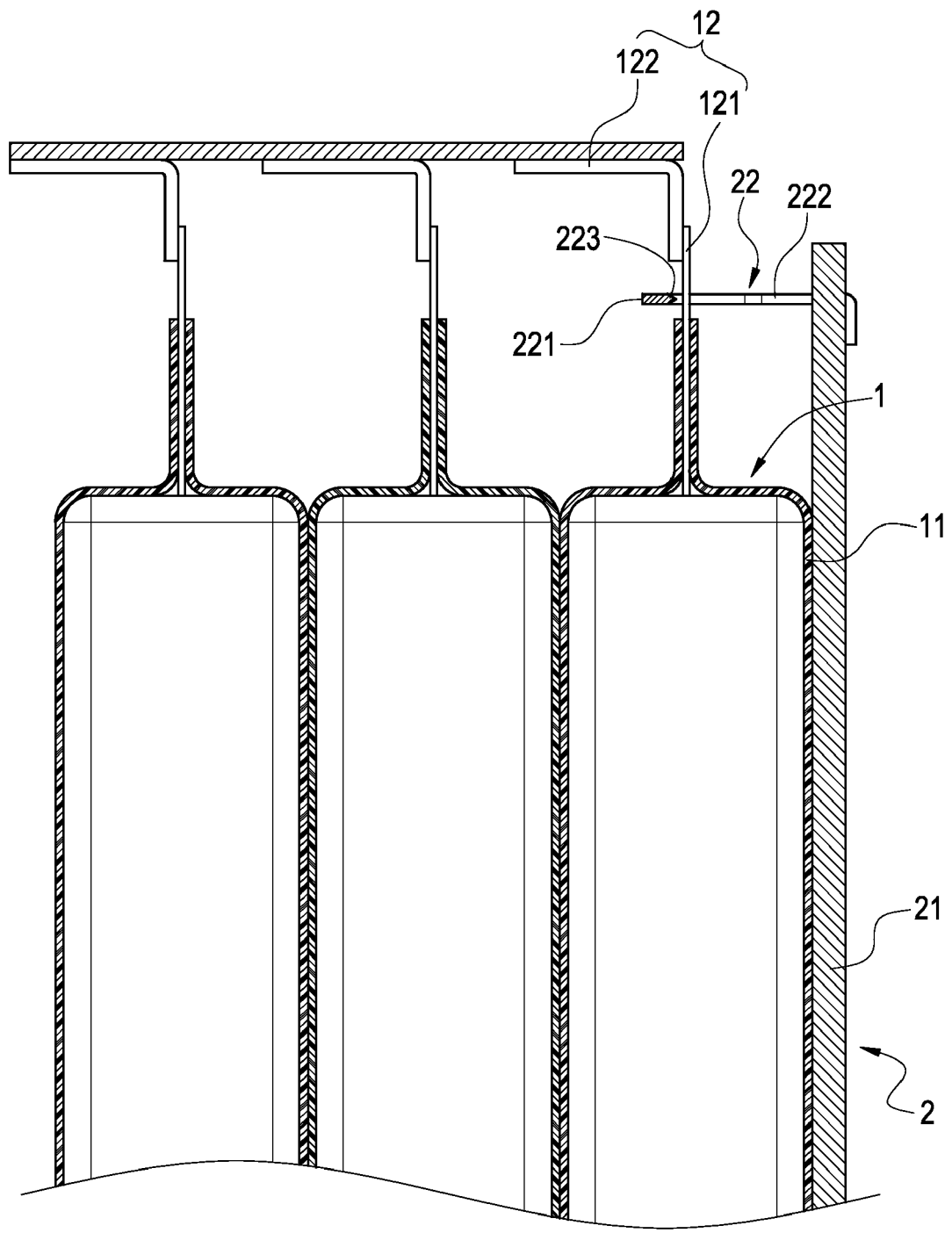
FIG. 4 is a sectional view of the present invention used for batteries.
Figure 5:
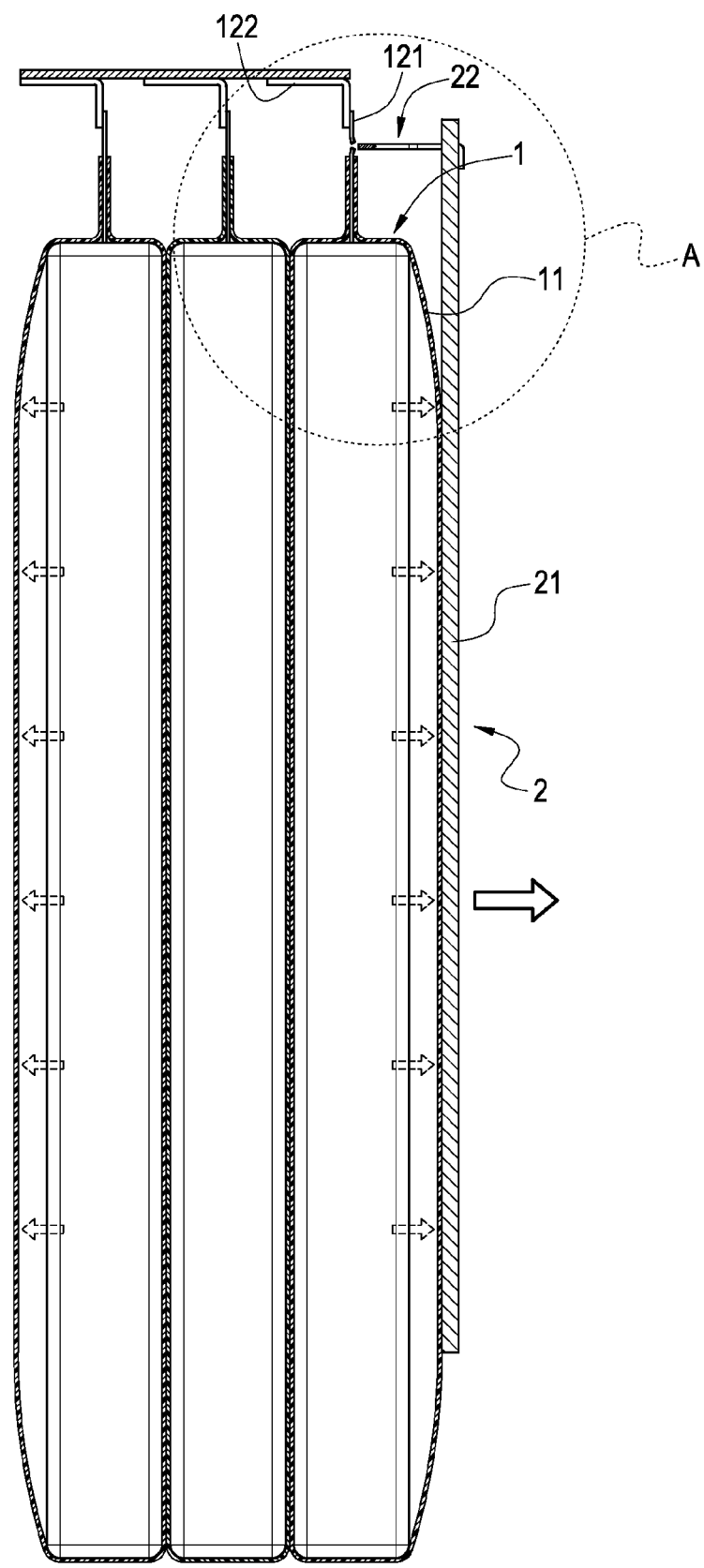
FIG. 5 is a sectional view showing the state after batteries are over-charged.
Figure 6:
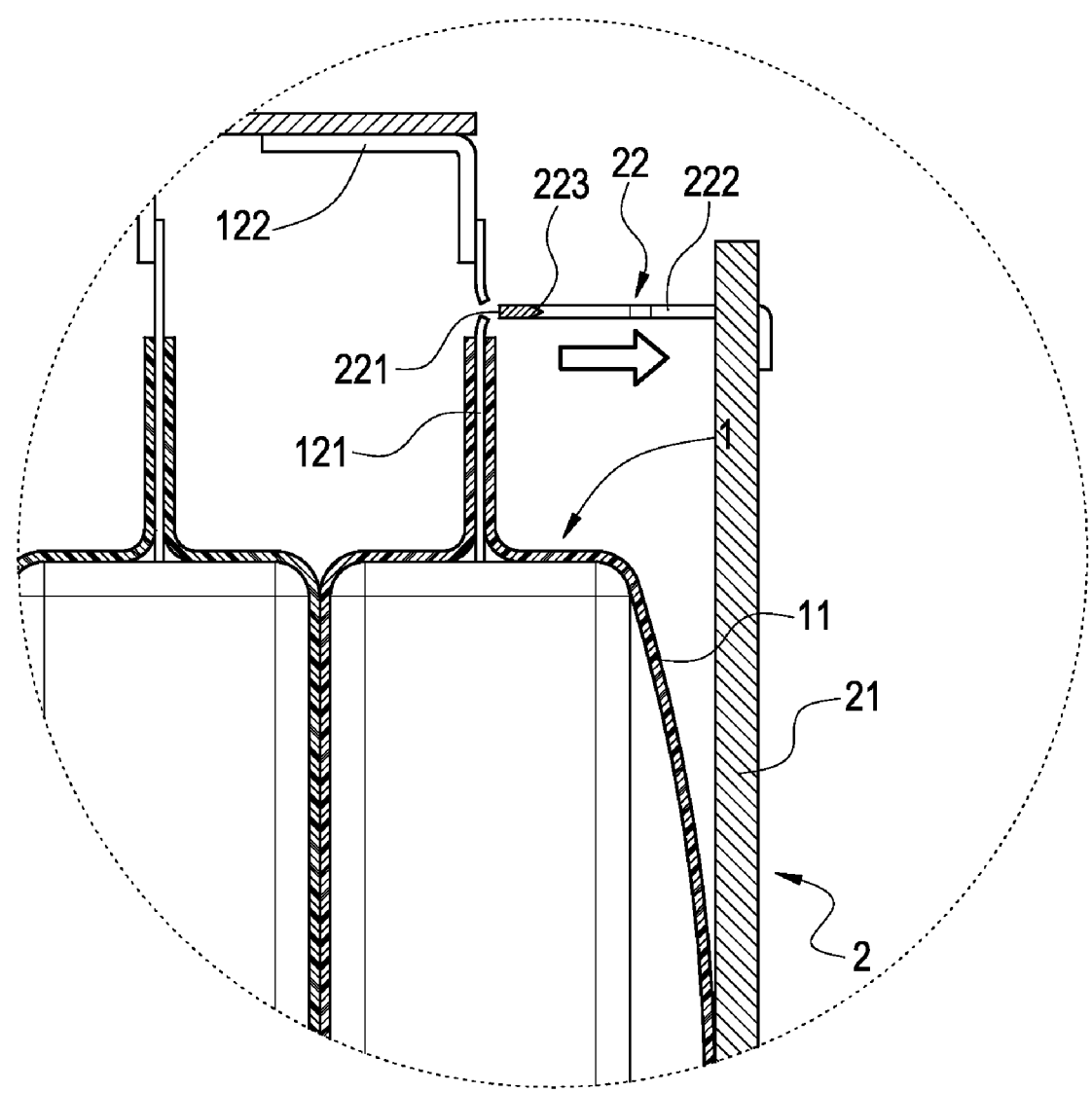
FIG. 6 is a partially enlarged view of the portion A in FIG. 5.

With reference to FIGS. 4 to 6, the power disconnection device 2 can be used for the battery set composed of multiple soft-shell Li ion batteries 1 in serial connection or parallel connection, besides the application to a single soft-shell Li ion battery 1. When the soft-shell Li ion battery 1 is excessively charged, the casing 11 has volume expansion. The panel 21 is moved away from the soft-shell Li ion battery 1 and the separation unit 22 cuts the anode leg 121 of the anode pin 12 to disconnect the electrical power. In ordinary use, the casing 11 has surface expansion when the soft-shell Li ion battery 1 is excessively charged. The panel 21 has about 2 mm lateral displacement, which is sufficient to cut the anode leg 121 by the cutting knife 221. Therefore, the safety for charging the soft-shell Li ion battery 1 is enhanced.

Figure 7:
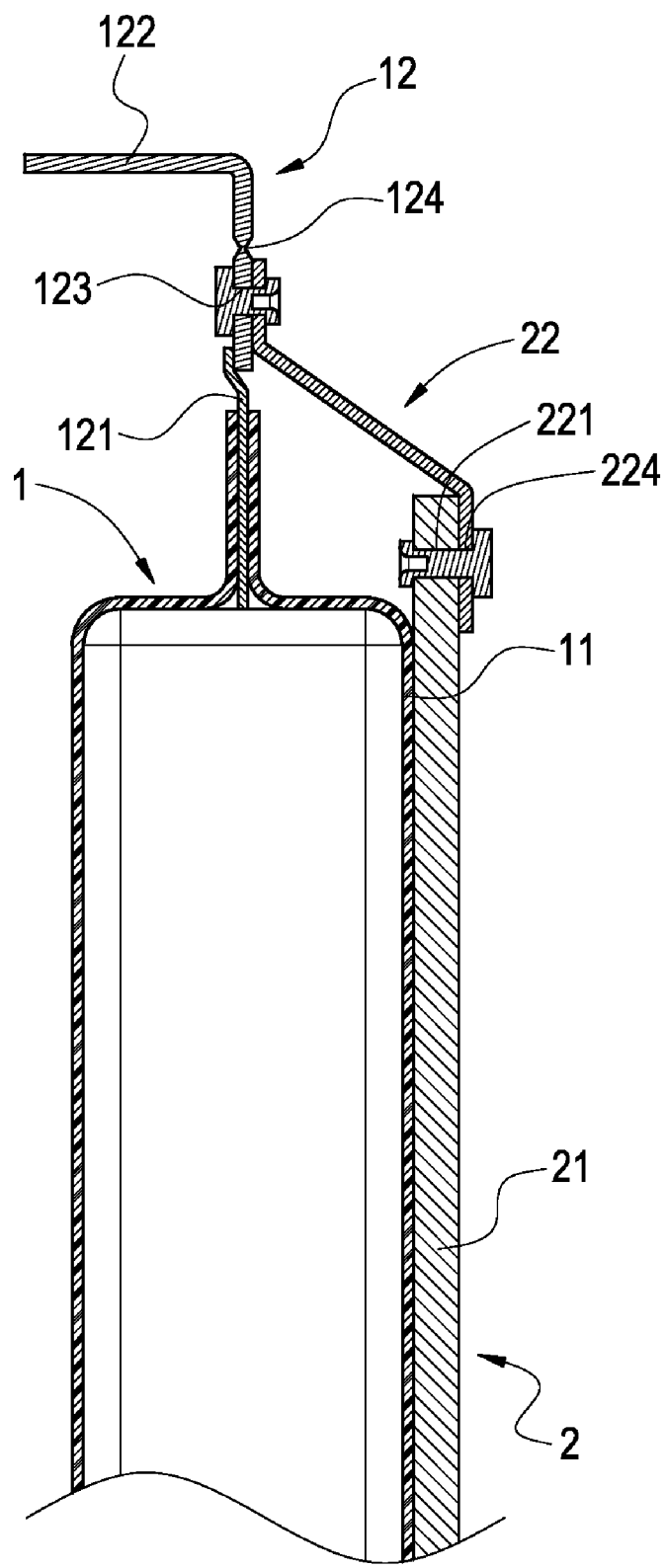
FIG. 7 is the sectional view of another preferred embodiment of the present invention.
Figure 8:
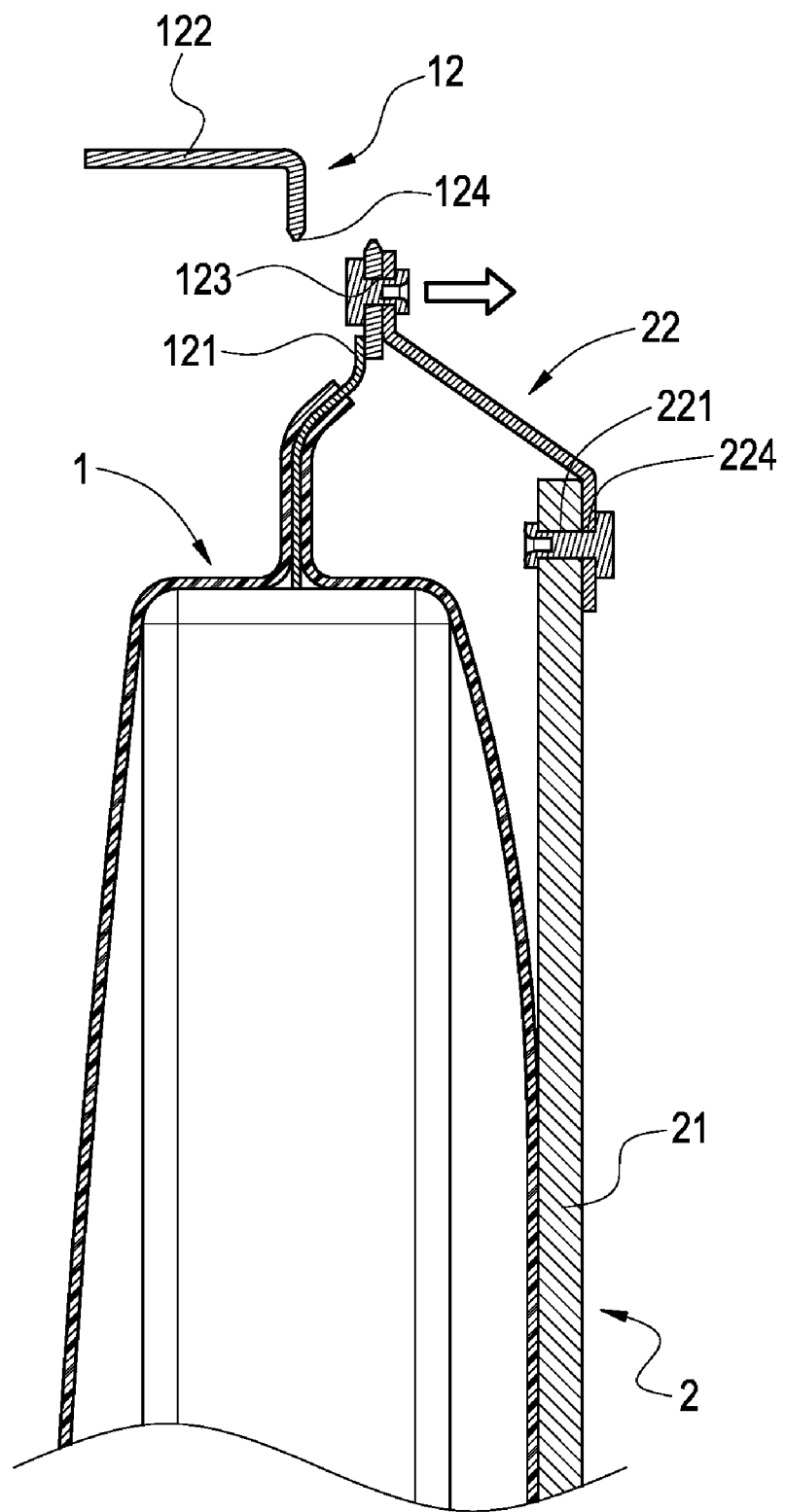
FIG. 8 is the sectional view showing the operation status in FIG. 7.

With reference to FIGS. 7 and 8, in another preferred embodiment of the present invention, a through hole 123 is defined on the anode flange 122 of the anode pin 12 and V-shaped groove 124 is formed atop the through hole 123. An aperture 211 is defined on the panel 21 of the power disconnection device. The separation unit 22 is of plate shape and openings 224 are defined at topside and bottom side thereof. Fixing element such as rivet passes through the through hole 123 and the openings 224, whereby both ends of the separation unit 22 are fixed to the anode flange 122 and the panel 21, respectively. The shell 11 has volume expansion when the soft-shell Li ion battery 1 is excessively charged. The panel 21 is moved away from the soft-shell Li ion battery 1 and the separation unit 22 cuts the anode flange 122 at the V-shaped groove 124.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A power disconnection apparatus for an over-charged soft-shell Li ion battery, comprising:
    a soft-shell Li ion battery comprising an electrode pin, and a soft shell enclosing the soft-shell Li ion battery; and
    a power disconnection device comprising a panel substantially attached to a central portion of a front surface of the soft shell and a separation unit connected to the panel and corresponding to the electrode pin, wherein a top portion of the panel is protruded out a top surface of the soft shell;
    wherein the soft shell is expanded when the soft-shell Li ion battery is over-charged and the panel is moved away from the soft-shell Li ion battery, whereby the separation unit disconnects power supplied the electrode pin,
    wherein the electrode pin comprises an electrode leg extended from a top portion of the soft shell and an electrode flange connected to a top end of the electrode leg and extended upwards away from the soft shell, and
    wherein the electrode flange of the electrode pin comprises a through hole close to the electrode leg and two V-shaped grooves are defined on the electrode flange atop the through hole, the panel comprises an aperture formed on the top portion thereof and the separation unit is of plate shape with openings at both ends thereof, the electrode flange and the panel and the separation unit are combined by using a fixing element respectively passing through the through hole and the aperture and the openings.

2. The power disconnection apparatus of claim 1, wherein the shell is an aluminum foil.

* * * * *